United States Patent
Arizono

(10) Patent No.: US 11,153,462 B2
(45) Date of Patent: Oct. 19, 2021

(54) COLOR CONVERSION TABLE CREATION METHOD, PRINTING METHOD, AND COLOR CONVERSION METHOD

(71) Applicant: SCREEN HOLDINGS CO., LTD., Kyoto (JP)

(72) Inventor: Shigenori Arizono, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 17/021,531

(22) Filed: Sep. 15, 2020

(65) Prior Publication Data

US 2021/0099615 A1 Apr. 1, 2021

(30) Foreign Application Priority Data

Sep. 30, 2019 (JP) ............................. JP2019-178326

(51) Int. Cl.
*H04N 1/60* (2006.01)

(52) U.S. Cl.
CPC ......... *H04N 1/6025* (2013.01); *H04N 1/6097* (2013.01)

(58) Field of Classification Search
CPC .. H04N 1/6025; H04N 1/6097; H04N 1/6033; H04N 1/6019; H04N 1/54
See application file for complete search history.

(56) References Cited

U.S. PATENT DOCUMENTS

2004/0223172 A1* 11/2004 Yoshizawa ........... H04N 1/6033
358/1.8
2012/0243011 A1 9/2012 Fukuda et al.

FOREIGN PATENT DOCUMENTS

EP 2 884 731 A1 6/2015
JP 2005-335191 A 12/2005

* cited by examiner

*Primary Examiner* — Christopher Wait
(74) *Attorney, Agent, or Firm* — McDermott Will & Emery LLP

(57) ABSTRACT

A granularity check chart is printed and granularity is evaluated for each area representing a combination of a color value of blue and a color value of cyan and magenta. Thereafter, an unusable region regarding combinations of a color value of blue and a color value of cyan and magenta is determined on the basis of evaluation results. Then, corresponding relationships among a color value of cyan and magenta before spot color separation, a color value of blue after the spot color separation, and a color value of cyan and magenta after the spot color separation are determined so that each combination of a color value of blue and a color value of cyan and magenta after the spot color separation is not included in the unusable region, and a spot color separation LUT is created so that the corresponding relationships are satisfied.

11 Claims, 21 Drawing Sheets

Fig.1

| | 100 | 90 | 80 | 70 | 60 | 50 | 40 | 30 | 20 | 10 | 0 |
|---|---|---|---|---|---|---|---|---|---|---|---|
| 100 | 0.7 | 0.9 | 1.1 | 1.3 | 1.3 | 1.3 | 1.2 | 1.2 | 1.1 | 1.1 | 0.9 |
| 90 | 0.7 | 1.0 | 1.1 | 1.3 | 1.4 | 1.4 | 1.3 | 1.3 | 1.3 | 1.3 | 1.0 |
| 80 | 0.8 | 1.0 | 1.2 | 1.4 | 1.5 | 1.6 | 1.6 | 1.6 | 1.7 | 1.7 | 1.5 |
| 70 | 0.9 | 1.1 | 1.3 | 1.5 | 1.7 | 2.0 | 2.2 | 2.4 | 2.5 | 2.4 | 2.1 |
| 60 | 1.2 | 1.3 | 1.4 | 1.7 | 2.2 | 2.9 | 3.0 | 3.0 | 2.9 | 2.8 | 2.4 |
| 50 | 1.4 | 1.5 | 1.6 | 2.0 | 2.7 | 3.3 | 3.3 | 3.3 | 3.1 | 2.8 | 2.2 |
| 40 | 1.5 | 1.5 | 1.7 | 2.4 | 3.1 | 3.4 | 3.3 | 3.2 | 2.8 | 2.5 | 1.9 |
| 30 | 1.6 | 1.6 | 1.9 | 2.6 | 3.1 | 3.4 | 3.2 | 3.1 | 2.9 | 2.6 | 1.9 |
| 20 | 1.7 | 1.7 | 2.1 | 2.8 | 3.1 | 3.4 | 3.2 | 3.2 | 3.0 | 2.7 | 1.8 |
| 10 | 1.6 | 1.7 | 2.2 | 2.7 | 2.9 | 3.1 | 3.0 | 3.0 | 2.8 | 2.4 | 1.3 |
| 0 | 0.5 | 0.8 | 1.7 | 2.2 | 2.4 | 2.6 | 2.4 | 2.4 | 2.1 | 1.5 | 0.2 |
| | 100 | 90 | 80 | 70 | 60 | 50 | 40 | 30 | 20 | 10 | 0 |

C VALUE (rows) / M VALUE (columns)

Fig.2

| B VALUE \ M VALUE | 100 | 90 | 80 | 70 | 60 | 50 | 40 | 30 | 20 | 10 | 0 |
|---|---|---|---|---|---|---|---|---|---|---|---|
| 100 | 0.5 | 0.6 | 0.6 | 0.6 | 0.6 | 0.6 | 0.6 | 0.6 | 0.7 | 0.7 | 0.7 |
| 90 | 0.7 | 0.7 | 0.8 | 0.9 | 1.1 | 1.1 | 1.2 | 1.4 | 1.6 | 1.6 | 1.7 |
| 80 | 1.0 | 1.1 | 1.2 | 1.3 | 1.7 | 2.4 | 2.9 | 3.4 | 3.7 | 3.7 | 3.8 |
| 70 | 1.4 | 1.4 | 1.5 | 1.9 | 2.5 | 3.4 | 3.7 | 4.1 | 4.2 | 4.2 | 4.4 |
| 60 | 1.5 | 1.6 | 1.7 | 2.1 | 2.9 | 3.6 | 3.8 | 4.0 | 4.2 | 4.2 | 4.1 |
| 50 | 1.7 | 1.8 | 2.0 | 2.7 | 3.4 | 4.0 | 3.8 | 4.0 | 4.2 | 4.2 | 4.2 |
| 40 | 1.6 | 1.6 | 1.9 | 2.7 | 3.1 | 3.3 | 3.4 | 3.5 | 3.5 | 3.6 | 3.4 |
| 30 | 1.7 | 1.8 | 2.1 | 2.8 | 3.3 | 3.7 | 3.6 | 3.6 | 3.5 | 3.6 | 3.4 |
| 20 | 1.8 | 1.9 | 2.2 | 2.8 | 3.1 | 3.4 | 3.4 | 3.5 | 3.5 | 3.4 | 2.9 |
| 10 | 1.6 | 1.8 | 2.2 | 2.5 | 2.8 | 3.1 | 3.1 | 3.2 | 3.2 | 2.8 | 2.2 |
| 0 | 0.5 | 0.8 | 1.6 | 2.2 | 2.4 | 2.6 | 2.3 | 2.4 | 2.1 | 1.5 | 0.2 |

Fig.3

| C | M | B | K | L*VALUE | a*VALUE | b*VALUE | SATURATION |
|---|---|---|---|---|---|---|---|
| 30 | 30 | 100 | 0 | 22 | 20 | −65 | 69 |
| 40 | 40 | 100 | 0 | 22 | 20 | −65 | 68 |
| 55 | 55 | 85 | 0 | 22 | 19 | −62 | 65 |
| 70 | 70 | 70 | 0 | 22 | 18 | −59 | 61 |
| 100 | 100 | 10 | 0 | 22 | 17 | −47 | 51 |
| 0 | 0 | 70 | 0 | 35 | 6 | −62 | 62 |
| 10 | 10 | 70 | 0 | 35 | 7 | −61 | 61 |
| 55 | 55 | 40 | 0 | 35 | 9 | −53 | 54 |
| 100 | 100 | 20 | 0 | 35 | 10 | −49 | 50 |
| 0 | 0 | 40 | 0 | 53 | −1 | −45 | 45 |
| 55 | 55 | 0 | 0 | 53 | 4 | −34 | 34 |
| 0 | 0 | 20 | 0 | 70 | −3 | −29 | 29 |
| 30 | 30 | 0 | 0 | 70 | 3 | −22 | 22 |
| 3 | 3 | 3 | 0 | 90 | 1 | −6 | 6 |
| 7 | 7 | 0 | 0 | 90 | 2 | −5 | 5 |

Fig.12

B VALUE

| | 100 | 90 | 80 | 70 | 60 | 50 | 40 | 30 | 20 | 10 | 0 |
|---|---|---|---|---|---|---|---|---|---|---|---|
| 100 | 0.5 | 0.6 | 0.6 | 0.6 | 0.6 | 0.6 | 0.6 | 0.6 | 0.7 | 0.7 | 0.7 |
| 90 | 0.7 | 0.7 | 0.8 | 0.9 | 1.1 | 1.1 | 1.2 | 1.4 | 1.6 | 1.6 | 1.7 |
| 80 | 1.0 | 1.1 | 1.2 | 1.3 | 1.7 | 2.4 | 2.9 | 3.4 | 3.7 | 3.7 | 3.8 |
| 70 | 1.4 | 1.4 | 1.5 | 1.9 | 2.5 | 3.4 | 3.7 | 4.1 | 4.2 | 4.2 | 4.4 |
| 60 | 1.5 | 1.6 | 1.7 | 2.1 | 2.9 | 3.6 | 3.8 | 4.0 | 4.2 | 4.2 | 4.1 |
| 50 | 1.7 | 1.8 | 2.0 | 2.7 | 3.4 | 4.0 | 3.8 | 4.0 | 4.2 | 4.2 | 4.2 |
| 40 | 1.6 | 1.6 | 1.9 | 2.7 | 3.1 | 3.3 | 3.4 | 3.5 | 3.5 | 3.6 | 3.4 |
| 30 | 1.7 | 1.8 | 2.1 | 2.8 | 3.3 | 3.7 | 3.6 | 3.6 | 3.5 | 3.6 | 3.4 |
| 20 | 1.8 | 1.9 | 2.2 | 2.8 | 3.1 | 3.4 | 3.4 | 3.5 | 3.5 | 3.4 | 2.9 |
| 10 | 1.6 | 1.8 | 2.2 | 2.5 | 2.8 | 3.1 | 3.1 | 3.2 | 3.2 | 2.8 | 2.2 |
| 0 | 0.5 | 0.8 | 1.6 | 2.2 | 2.4 | 2.6 | 2.3 | 2.4 | 2.1 | 1.5 | 0.2 |
| | 100 | 90 | 80 | 70 | 60 | 50 | 40 | 30 | 20 | 10 | 0 |

CM VALUE

| B VALUE | MINIMUM CM VALUE |
|---------|------------------|
| 0 | 0 |
| 10 | 0 |
| 20 | 40 |
| 30 | 60 |
| 40 | 40 |
| 50 | 60 |
| 60 | 60 |
| 70 | 50 |
| 80 | 30 |
| 90 | 0 |
| 100 | 0 |

Fig.15

| B VALUE | MINIMUM CM VALUE |
|---------|------------------|
| 0 | 0 |
| 10 | 2 |
| 20 | 40 |
| 30 | 61 |
| 40 | 65 |
| 50 | 65 |
| 60 | 60 |
| 70 | 50 |
| 80 | 30 |
| 90 | 0 |
| 100 | 0 |

Fig.18

| INPUT CM VALUE | OUTPUT B VALUE | OUTPUT CM VALUE |
|---|---|---|
| 0 | 0 | 0 |
| 10 | 8 | 10 |
| 20 | 15 | 25 |
| 30 | 23 | 43 |
| 40 | 35 | 60 |
| 50 | 50 | 65 |
| 60 | 65 | 60 |
| 70 | 80 | 45 |
| 80 | 90 | 25 |
| 90 | 98 | 10 |
| 100 | 100 | 0 |

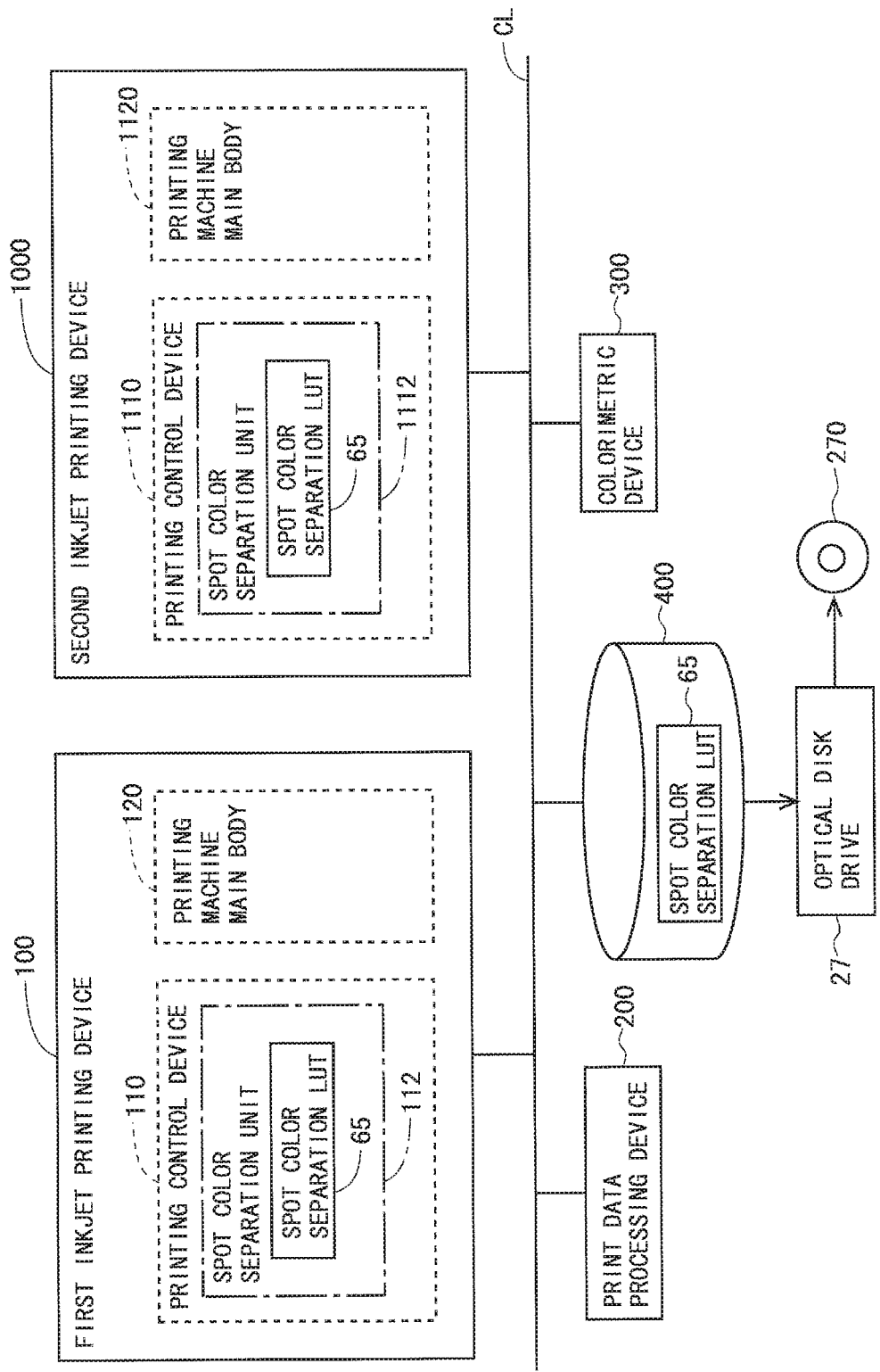

COLOR CONVERSION TABLE CREATION METHOD, PRINTING METHOD, AND COLOR CONVERSION METHOD

BACKGROUND OF THE INVENTION

Field of the Invention

The present invention relates to a method for creating a color conversion table to be used when printing using spot color ink is performed and to a color conversion method using the color conversion table.

Description of Related Art

In regard to printing, in the field of label and package, spot colors tend to be used frequently in order to enhance color expression. Also, in order to maintain a brand image of a company, the same spot color may be used continuously due to the emphasis on color reproducibility. By the way, in recent years, digital printing devices have become more and more popular in the printing industry. According to the digital printing device, since no printing plates are used, there is no need to replace and recreate the printing plate. Accordingly, by adopting a digital printing device, it is possible to print especially small lots at low cost, and it is also possible to respond to requests for shortening of the delivery time for production of design and content at low cost.

However, in a conventional digital printing device, since ink of specific colors (C: cyan, M: magenta, Y: yellow, K: black) called process colors are uses for printing, it is difficult to exactly reproduce a spot color having a high saturation. For that reason, a digital printing device has been developed that can be equipped with ink of colors (e.g., orange, green, and blue) other than CMYK in order to achieve a large color gamut (a large color reproduction range). Regarding the printed material obtained by the digital printing device, granularity thereof is an important factor in determining the print quality, that is of course true in a case in which ink of five or more colors are used.

In the Japanese Patent Publication No. 2005-3351, the following method is disclosed as a method of reducing granular feeling by a printer using light ink. In a printer using at least blue ink, light cyan ink, and light magenta ink in addition to CMYK ink, in order to reduce the granular feeling of the printed material, light ink (light cyan ink Lc and light magenta ink Lm) are used to print a color close to white when reproducing the blue hue, as shown in FIG. 20.

Further, regarding printers not equipped with light ink, a method of using low-density ink instead of high-density ink in order to reduce the granular feeling of the printed material when reproducing a color of a highlight portion (a color having a high brightness) is also known. For example, in a general printer that uses CMYK ink, color separation is performed so that K ink is used for only colors darker than the intermediate tone portion as shown in FIG. 21 regarding gray. According to this method, the use of high-density ink in skin color portion that is sensitive to the human eye is suppressed, and it is possible to obtain an effect that a smooth gradation expression is realized regarding the skin color portion.

By the way, the granular feeling at the highlight portion is caused by the prominence of dots of the high-density ink when a small amount of the high-density ink is adhered to the paper white. Such granular feeling at the highlight portion can be reduced by the conventional method described above. However, in a digital printing device that uses ink of five or more colors in order to obtain a large color gamut (in a digital printing device that uses high saturation ink in addition to CMYK ink), the granular feeling may be noticeable in an intermediate tone portion. For example, in a digital printing device that uses blue ink in addition to CMYK ink, there are cases where the granular feeling becomes large in the intermediate tone portion instead of the highlight portion. This is due to the fact that the ink does not spread to the printing medium due to the effect of wettability, depending on the interrelationship among the ink characteristics, the printing medium (printing paper, etc.), the printing method, and so on, and a density difference occurs between the paper white and an ink adhered portion. In particular, in a case in which the high-density ink is used, the density difference is emphasized and the granular feeling becomes large.

SUMMARY OF THE INVENTION

For that reason, an object of the present invention is to reduce the granular feeling of the printed material when printing is performed using high saturation ink in addition to ink of process colors.

One aspect of the present invention is directed to a method for creating a color conversion table for performing color conversion from a first print data including only color values of process colors to a second print data including color values of a spot color and color values of process colors, the method including:

an evaluation step of evaluating granularity for each area representing a combination of a color value of a spot color and a color value of process colors, an unusable region setting step of determining an unusable region that is a part of a plurality of areas each representing a combination of a color value of a spot color and a color value of process colors, based on evaluation results obtained in the evaluation step, an association step of determining corresponding relationships among a color value of process colors before the color conversion, a color value of a spot color after the color conversion, and a color value of process colors after the color conversion so that each combination of a color value of a spot color and a color value of process colors after the color conversion is not included in the unusable region, and a table creation step of creating the color conversion table so that the corresponding relationships determined in the association step are satisfied.

According to such a configuration, based on the evaluation results concerning the granularity, an unusable region regarding combinations of a color value of a spot color and a color value of process colors is determined. Then, a color conversion table for performing color conversion from a first print data including only color values of process colors to a second print data including color values of a spot color and color values of process colors is created so that each "combination of a color value of a spot color and a color value of process colors" after the color conversion is not included in the unusable region. By performing printing using the print data (the second print data) after the color conversion based on such color conversion table, a high quality printed material whose granular feeling is small can be obtained. As above, the granular feeling of the printed material is reduced when printing is performed using high saturation ink in addition to ink of process colors.

Another aspect of the present invention is directed to a color conversion method for converting input data including only color values of process colors into print data including color values of a spot color and color values of process colors, including:

an evaluation step of evaluating granularity for each area representing a combination of a color value of a spot color and a color value of process colors, an unusable region setting step of determining an unusable region that is a part of a plurality of areas each representing a combination of a color value of a spot color and a color value of process colors, based on evaluation results obtained in the evaluation step, an association step of determining corresponding relationships among a color value of process colors before color conversion, a color value of a spot color after the color conversion, and a color value of process colors after the color conversion so that each combination of a color value of a spot color and a color value of process colors after the color conversion is not included in the unusable region, a table creation step of creating a color conversion table so that the corresponding relationships determined in the association step are satisfied, a color chart printing step of printing a color chart by a target printing device after applying the color conversion table created in the table creation step to data for creating the color chart, a colorimetry step of performing colorimetry of the color chart, a color profile creation step of creating a color profile for output, based on colorimetry results obtained in the colorimetry step, a first conversion step of converting the input data into device-independent data using a color profile for input, a second conversion step of converting the device-independent data into the first print data using the color profile for output created in the color profile creation step, and a third conversion step of converting, using the color conversion table created in the table creation step, the first print data into the second print data that is used to print by the target printing device.

These and other objects, features, modes, and advantageous effects of the present invention will become more apparent from the following detailed description of the present invention with reference to the accompanying drawings.

BRIEF DESCRIPTION OF THE DRAWINGS

FIG. 1 is a diagram showing results (evaluation values each corresponding to a combination of a C value and a M value) obtained, using a certain granularity measurement device, by evaluation concerning granularity of a printed material.

FIG. 2 is a diagram showing results (evaluation values each corresponding to a combination of a B value and a M value) obtained, using a certain granularity measurement device, by evaluation concerning the granularity of a printed material.

FIG. 3 is a diagram showing colorimetry values corresponding to various combinations of a C value, a M value, a B value, and a K value.

FIG. 12 is a diagram for explaining an unusable region in the embodiment.

FIG. 13 is a diagram for explaining a minimum CM value determined on the basis of the unusable region in the embodiment.

FIG. 15 is a diagram for explaining minimum CM values after correction in the embodiment.

FIG. 18 is a diagram showing an example of corresponding relationships among an input CM value, an output B value, and an output CM value in the embodiment.

FIG. 22 is an overall configuration diagram of a printing system according to a variant of the embodiment.

DETAILED DESCRIPTION OF PREFERRED EMBODIMENTS

<0. Basic Consideration>

Figure 4:
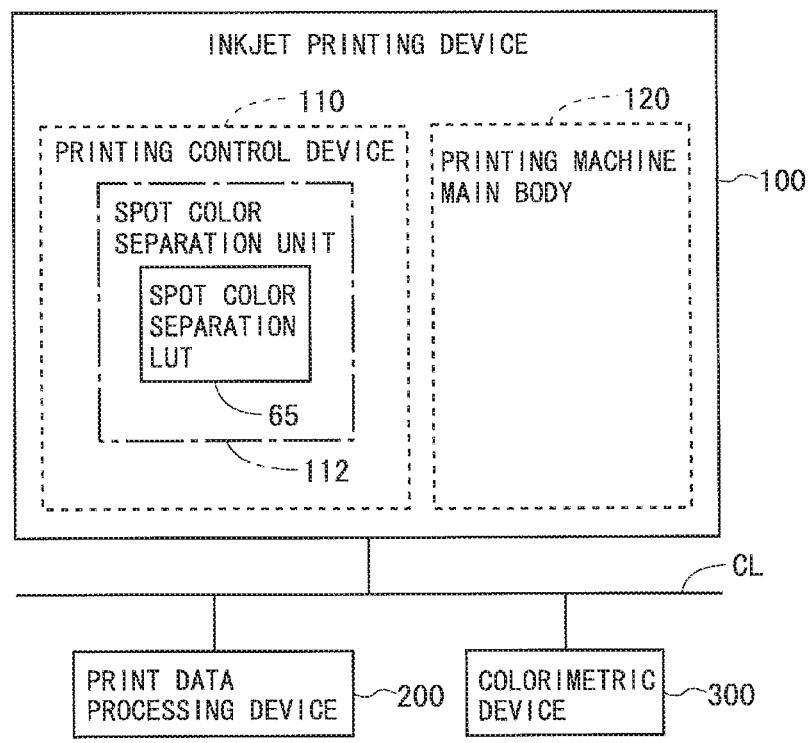
FIG. 4 is an overall configuration diagram of a printing system according to one embodiment of the present invention.

Before explaining an embodiment, we explain granularity of a printed material when printing is performed using high saturation ink. It should be noted that, in the following, a color value of each color is represented by a halftone dot percentage (that is, the minimum value thereof is 0 and the maximum value thereof is 100).

Results (evaluation values) obtained, using a certain granularity measurement device, by evaluation concerning the granularity of the printed material are shown in FIG. 1 and FIG. 2. It should be noted that the larger the evaluation value, the larger the granular feeling. FIG. 1 shows evaluation values each corresponding to a combination of a C value (a color value of cyan) and a M value (a color value of magenta). For example, the evaluation value in a case in which the C value is 50 and the M value is 60 is 2.7. FIG. 2 shows evaluation values each corresponding to a combination of a B value (a color value of blue) and a M value. For example, the evaluation value in a case in which the B value is 50 and the M value is 60 is 3.4.

In FIG. 1 and FIG. 2, we focus on a row where the M value is 0. In the focused row in FIG. 1, evaluation values for respective color values of cyan in a case in which only cyan ink is used are shown. In the focused row in FIG. 2, evaluation values for respective color values of blue in a case in which only blue ink is used are shown. By comparing the above two cases, it is grasped that the granularity is worse in the case in which only blue ink is used than in the case in which only cyan ink is used. In the case in which only blue ink is used, the granular feeling is large especially when the B value is 50 or more and 70 or less. Moreover, as grasped from FIG. 2, the larger the M value, the smaller the granular feeling. That is, it is considered that the granular feeling of the printed material can be reduced by using, for example, magenta ink of a predetermined quantity or more depending on the B value when blue ink is used. It should be noted that since the maximum value of the evaluation values in FIG. 1 is 3.4, it is assumed that the granularity is acceptable when the evaluation value is 3.4 or less in the embodiment described below.

FIG. 3 shows colorimetry values corresponding to various combinations of a C value, a M value, a B value, and a K value (a color value of black). It should be noted that L* value corresponds to a brightness. From FIG. 3, when focusing on a plurality of cases for the same brightness, it is grasped that the larger the ratio of the B value, the higher the saturation. That is, color reproduction using a large color gamut becomes possible by reducing the ratio of the C value or the M value and increasing the ratio of the B value. However, as described above, in order to make the granular feeling small, it is necessary to enlarge the M value, for example. As above, excellence of the granularity and largeness of color gamut have a trade-off relationship. Thus, in the embodiment described below, printing is performed using high saturation ink taking into consideration the balance of excellence of the granularity and largeness of color gamut.

Hereinafter, an embodiment of the present invention will be described with reference to the drawings.

<1. Overall Configuration of Printing System>

FIG. 4 is an overall configuration diagram of a printing system according to one embodiment of the present invention. This printing system is composed of an inkjet printing device 100, a print data processing device 200 that performs various processing, such as raster image processing (RIP), on print data, and a colorimetric device 300 that performs colorimetry. The inkjet printing device 100, the print data processing device 200, and the colorimetric device 300 are connected to each other via a communication line CL. It should be noted that the colorimetric device 300 may be directly connected to the print data processing device 200 not via the communication line CL. The inkjet printing device 100 performs printing based on print data that is digital data without using a printing plate. The inkjet printing device 100 includes a printing machine main body 120 and a printing control device 110 that controls the printing machine main body 120.

The inkjet printing device 100 in the present embodiment is configured to be able to print using a spot color in addition to process colors. Therefore, when printing is performed using spot color ink, a color conversion processing called "spot color separation" that converts print data including only color values of process colors into print data including color values of a spot color and color values of process colors is performed. In the present embodiment, a look-up table that is used for the spot color separation is created by the print data processing device 200. Hereinafter, the look-up table is referred to as "a spot color separation LUT", and a reference numeral 65 is attached to the spot color separation LUT. Further, the printing control device 110 includes a spot color separation unit 112 that is a functional constituent element for performing the spot color separation. The spot color separation unit 112 performs the spot color separation using the spot color separation LUT 65 that is given from the print data processing device 200.

Although there is an inkjet printing device 100 that can be equipped with spot color ink of two or more colors, here, an inkjet printing device 100 that can be equipped with spot color ink of one color will be described as an example. Specifically, an inkjet printing device 100 equipped with blue ink as spot color ink will be described as an example. Accordingly, in the example described below, print data including the C value, the M value, the Y value, and the K value (hereinafter, referred to as "CMYK data") is converted into print data including the C value, the M value, the Y value, the K value, and the B value (hereinafter, referred to as "CMYKB data") by the spot color separation. That is, the spot color separation unit 112 converts the CMYK data into the CMYKB data.

<2. Configuration of Inkjet Printing Device>

Figure 5:
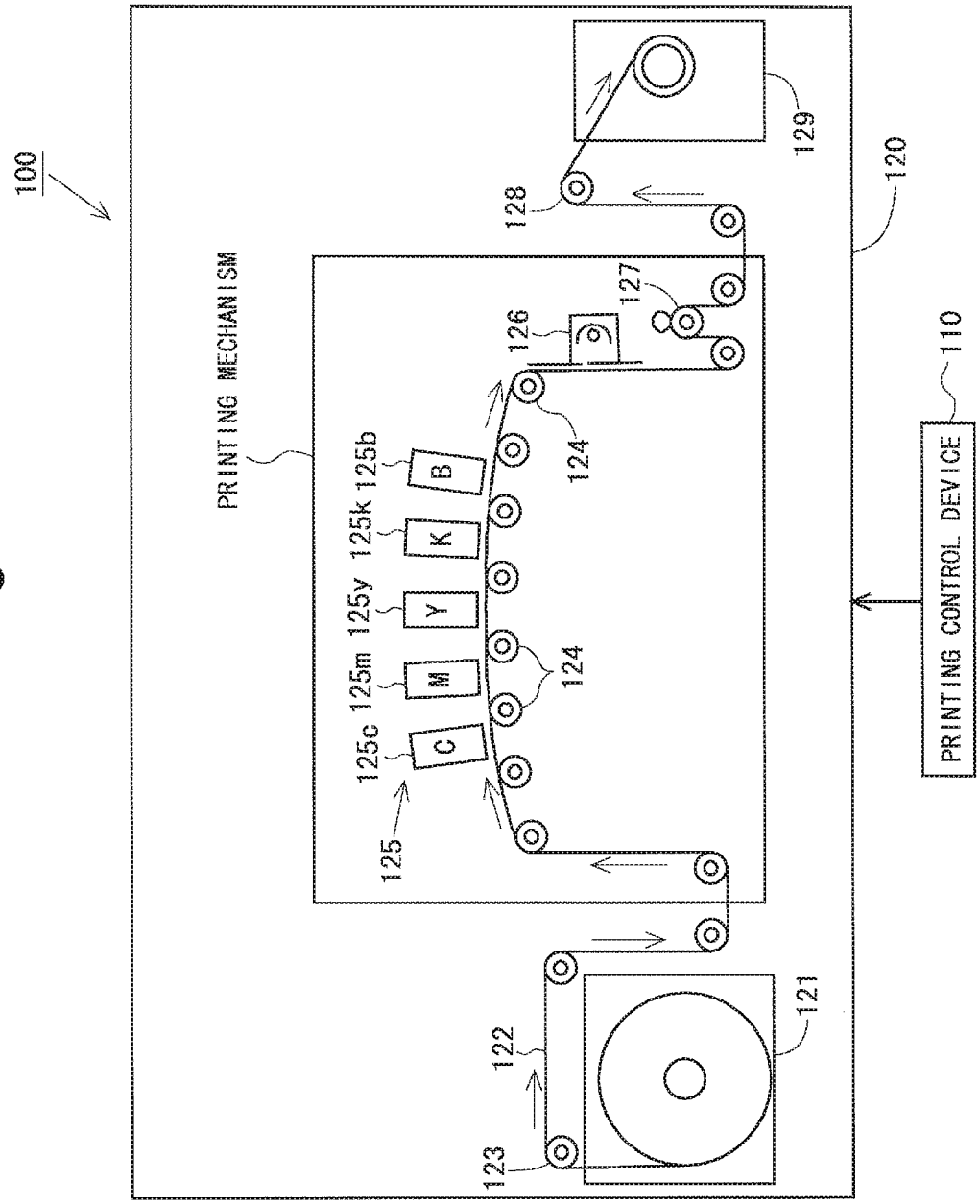
FIG. 5 is a schematic diagram showing one configuration example of an inkjet printing device in the embodiment.

FIG. 5 is a schematic diagram showing one configuration example of the inkjet printing device 100 in the present embodiment. As described above, this inkjet printing device 100 includes a printing machine main body 120 and a printing control device 110 that controls the printing machine main body 120.

The printing machine main body 120 includes: a paper feeding unit 121 that supplies printing paper (for example, roll paper) 122 as a base material; a first driving roller 123 for conveying the printing paper 122 to an inside of a printing mechanism; a plurality of supporting rollers 124 for conveying the printing paper 122 in the printing mechanism; a printing unit 125 that performs printing by ejecting ultraviolet curing ink to the printing paper 122; an ultraviolet irradiation unit 126 that irradiates the printing paper 32 after printing with ultraviolet; a dancer roller 127; a second driving roller 128 for outputting the printing paper 122 from the inside of the printing mechanism; and a paper winding unit 129 that winds up the printing paper 122 after printing. In this manner, the printing paper 122 is conveyed from the paper feeding unit 121 towards the paper winding unit 129 in a constant conveying direction by the first driving roller 123 and the second driving roller 128.

The printing unit 125 includes a C inkjet head 125c, a M inkjet head 125m, a Y inkjet head 125y, a K inkjet head 125k, and a B inkjet head 125b, which eject ink of C (cyan), M (magenta), Y (yellow), K (black), and B (blue), respectively. By such a configuration, in the present embodiment, printing is performed using ink of blue as a spot color in addition to ink of process colors.

The printing control device 110 controls the operation of the printing machine main body 120 having the above-described configuration. When a printout instruction command is given to the printing control device 110, the printing control device 110 controls the operation of the printing machine main body 120 so that the printing paper 122 is conveyed from the paper feeding unit 121 to the paper winding unit 129. In the conveyance process of the printing paper 122, first, printing is performed by ejecting ink from each of the inkjet heads 125c, 125m, 125y, 125k, and 125b in the printing unit 125, then ink ejected on the printing paper 122 is cured by the ultraviolet irradiation unit 126.

<3. Hardware Configuration of Print Data Processing Device>

Figure 6:
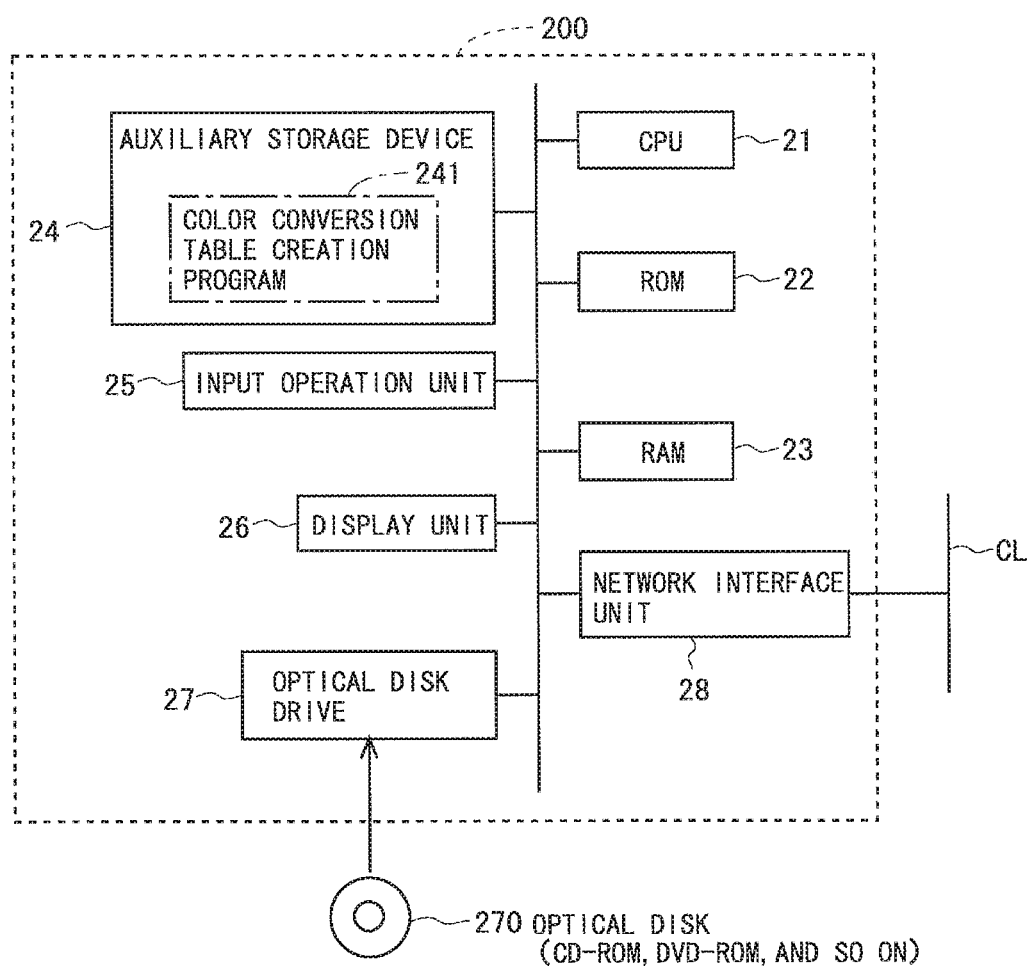
FIG. 6 is a hardware configuration diagram of a print data processing device in the embodiment.

FIG. 6 is a hardware configuration diagram of the print data processing device 200 in the present embodiment. The print data processing device 200 is realized by a personal computer. The print data processing device 200 has a CPU 21, a ROM 22, a RAM 23, an auxiliary storage device 24, an input operation unit 25 such as a keyboard, a display unit 26, an optical disk drive 27, and a network interface unit 28. Data sent via the communication line CL is inputted to the inside of the print data processing device 200 via the network interface unit 28. Print data (the above-described CMYK data) generated by the print data processing device 200 is sent to the inkjet printing device 100 through the communication line CL via the network interface unit 28.

In the present embodiment, a color conversion table creation program 241 for creating the spot color separation LUT 65 is stored in the auxiliary storage device 24. The color conversion table creation program 241 is provided being stored in a computer-readable recording medium (non-transitory recording medium), such as a CD-ROM or a DVD-ROM. That is, a user purchases an optical disk (such as a CD-ROM or a DVD-ROM) 270 as a recording medium of the color conversion table creation program 241, mounts the optical disk 270 in the optical disk drive 27, and reads the color conversion table creation program 241 from the optical disk 270, and installs the color conversion table creation program 241 into the auxiliary storage device 24. Alternatively, the color conversion table creation program 241 sent through the communication line CL may be received at the network interface unit 28, and be installed in the auxiliary storage device 24.

When the spot color separation LUT 65 is created, the color conversion table creation program 241 stored in the auxiliary storage device 24 is loaded into the RAM 23, and the color conversion table creation program 241 loaded into the RAM 23 is executed by the CPU 21. With this, a function to perform various processings related to creation of the spot color separation LUT 65 is provided by the print data processing device 200.

<4. Overall Procedure>

Figure 7:
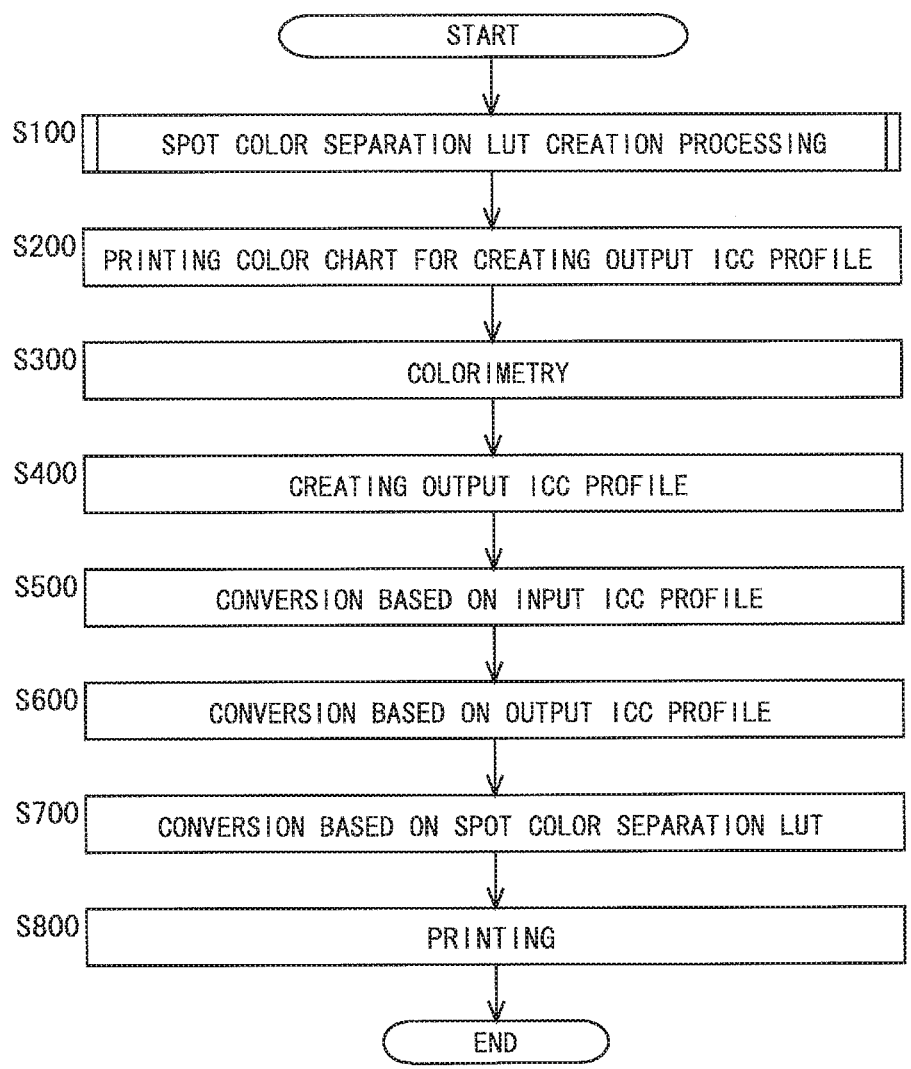
FIG. 7 is a flowchart showing an overall procedure from receiving input data to be printed to execution of print output in the embodiment.
Figure 8:
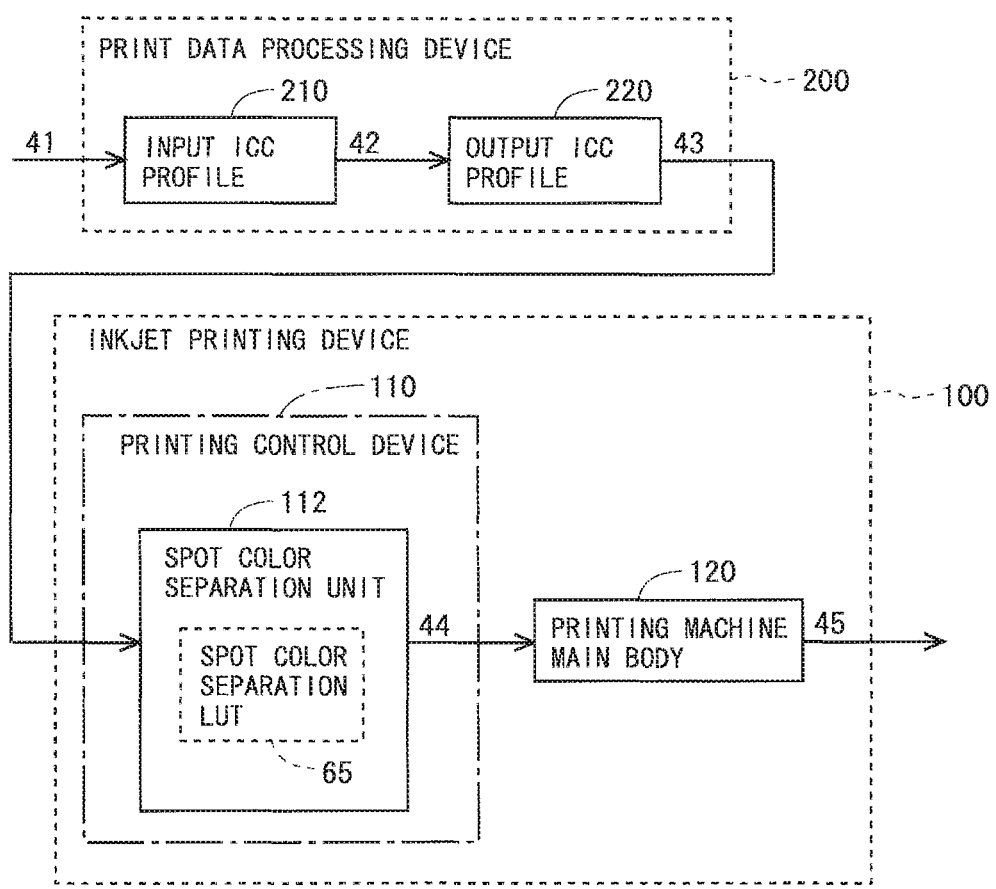
FIG. 8 is a diagram for explaining the data flow from receiving input data to be printed to execution of print output in the embodiment.

Referring to FIG. 7 and FIG. 8, an overall procedure from receiving input data to be printed to execution of print output will be described. It should be noted that FIG. 7 is a flowchart showing the overall procedure and FIG. 8 is a diagram for explaining the data flow.

After the input data 41 is inputted to the print data processing device 200, first, a spot color separation LUT creation processing for creating the spot color separation LUT 65 as a color conversion table is performed (step S100). The spot color separation LUT 65 is created for each printing condition. The spot color separation LUT 65 corresponding to a printing condition at the time of printing is stored in the spot color separation unit 112 in the printing control device 110. It should be noted that examples of settable printing conditions include type of paper, printing speed, resolution, and so on.

Next, a color chart for creating an output ICC profile is printed (step S200). At that time, the spot color separation LUT 65 created in the step S100 is applied to data for creating the color chart. By this, data conversion based on the output ICC profile 220 (step S600 described below) is performed taking into consideration the content of the spot color separation LUT 65.

Next, colorimetry of the color chart printed in the step S200 is performed by the colorimetric device 300 (step S300). Then, the output ICC profile 220 is created on the basis of colorimetry results obtained in the step S300 (step S400). Regarding this, as a result of colorimetry in the step S300, for example, Lab values are obtained for each patch of the color chart. Further, the CMYK values (the C value, the M value, the Y value, and the K value) for each patch of the color chart are known. In this manner, since corresponding relationships between, for example, the Lab values and the CMYK values are obtained, the output ICC profile 220 can be created on the basis of the corresponding relationships.

After the output ICC profile 220 is created, a processing that converts the input data 41 into device-independent data 42 which is data in profile connection space (PCS) (for example, data in CIELab color space) is performed using an input ICC profile 210 acquired in advance (step S500). Then, a processing that converts the device-independent data 42 into the CMYK data 43 is performed using the output ICC profile 220 created in the step S400 (step S600). The CMYK data 43 generated in the step S600 is sent to the inkjet printing device 100 from the print data processing device 200.

Thereafter, a processing that converts the CMYK data 43 into the CMYKB data 44 (the spot color separation) is performed using the spot color separation LUT 65 by the spot color separation unit 112 in the printing control device 110 (step S700). Then, CMYKB data 44 obtained in the step S700 is sent to the printing machine main body 120, and printing is executed (step S800). Thus, a printed material 45 is outputted from the printing machine main body 120. In the present embodiment, by performing the spot color separation LUT creation processing as described below, the granular feeling of the printed material 45 obtained when high saturation ink is used is reduced as compared to the conventional one.

It should be noted that, in the present embodiment, the color chart printing step is realized by the step S200, the colorimetry step is realized by the step S300, the color profile creation step is realized by the step S400, the first conversion step is realized by the step S500, the second conversion step is realized by the step S600, and the third conversion step is realized by the step S700. Further, the first print data is realized by the CMYK data 43, and the second print data is realized by the CMYKB data 44.

Moreover, although the spot color separation is performed by the printing control device 110 in the present embodiment, the present invention is not limited to this. The spot color separation may be performed by the print data processing device 200.

<5. Spot Color Separation LUT Creation Processing>

Figure 9:
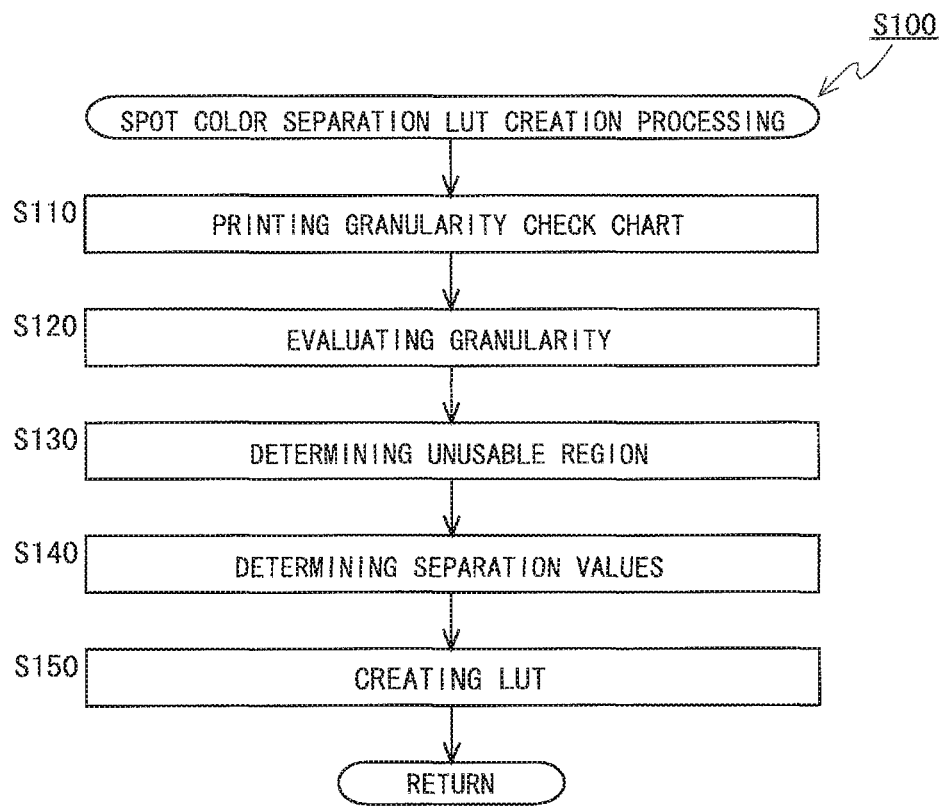
FIG. 9 is a flowchart showing a procedure of a spot color separation LUT creation processing in the embodiment.
Figure 10:
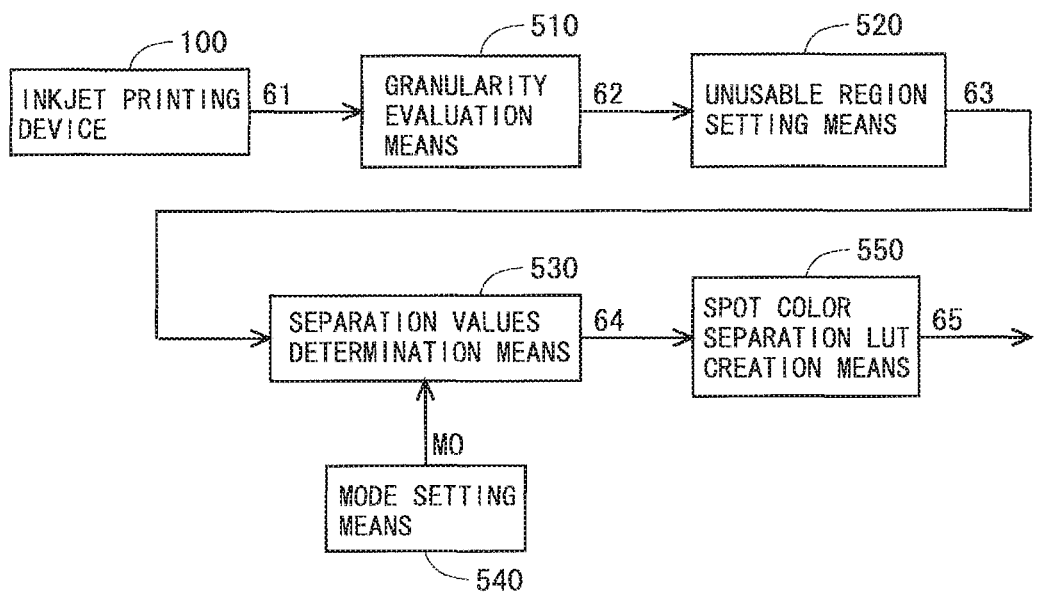
FIG. 10 is a functional block diagram for explaining functions necessary for the spot color separation LUT creation processing in the embodiment.

Next, the spot color separation LUT creation processing (the processing of step S100 in FIG. 7) will be described in detail. FIG. 9 is a flowchart showing a procedure of the spot color separation LUT creation processing. FIG. 10 is a functional block diagram for explaining functions necessary for the spot color separation LUT creation processing. It should be noted that, in the present embodiment, blue is a target spot color, cyan corresponds to a first process color, and magenta corresponds to a second process color.

Figure 11:
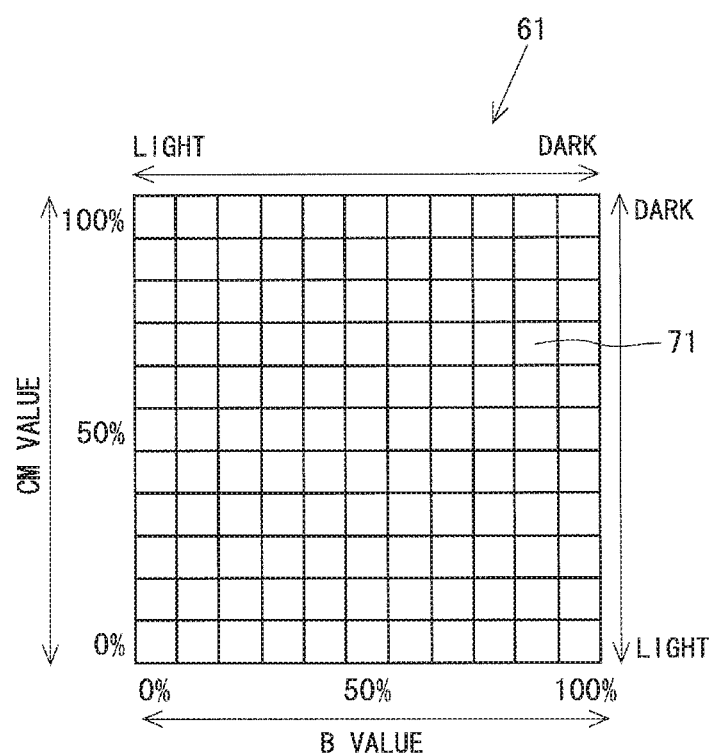
FIG. 11 is a diagram for explaining a granularity check chart in the embodiment.

After the spot color separation LUT creation processing is started, first, a granularity check chart 61 used for evaluation of the granularity is printed by the inkjet printing device 100 (step S110). The granularity check chart 61 in the present embodiment is composed of a plurality of patches corresponding to a plurality of combinations of a B value and a CM value as shown in FIG. 11. It should be noted that the CM value is C value and M value on the assumption that C and M are set to the same value. Regarding the granularity check chart 61 shown in FIG. 11, for example, a patch indicated by a reference numeral 71 is a patch printed with "the B value is 90, the C value is 70, and the M value is 70". As above, in the step S110, the granularity check chart 61 including a plurality of patches corresponding to a plurality of combinations of a color value of a spot color (here, a B value) and a color value of process colors (here, a CM value) is printed.

Next, based on the printing state of the granularity check chart 61, the granularity is evaluated for each area (each patch) representing a combination of a B value and a CM value (step S120). This evaluation concerning the granularity may be performed using a granularity measurement device and may be performed by visual observation. That is, a granularity evaluation means 510 that evaluates the granularity may be realized by the granularity measurement device and may be realized by a work by visual observation. However, here, it is assumed that the granularity is evaluated using the granularity measurement device. Therefore, the evaluation value representing the granularity is obtained for each combination of a B value and a CM value. It should be noted that, in order to realize the processing after step S130 by software (program), it is necessary to provide a step (an evaluation result input accepting step) in which, for example, the print data processing device 200 accepts an input of evaluation results by a user.

Next, based on the evaluation results 62 obtained in the step S120, an unusable region that is a part of a plurality of areas (a region corresponding to all patches constituting the granularity check chart 61) each representing a combination of a B value and a CM value is determined (step S130). The unusable region is a region corresponding to "combinations of a B value and a CM value" in which the granularity may not be acceptable (in other words, "combinations of a B value and a CM value" which should not be included in the CMYKB data 44). For example, a region corresponding to "combinations of a B value and a CM value" whose evaluation values obtained in the step S120 are larger than a predetermined value is set as the unusable region. In the present embodiment, it is determined that the granularity is acceptable if the evaluation value is 3.4 or less, and a region corresponding to "combinations of a B value and a CM value" whose evaluation are larger than 3.4 is set as the unusable region. In a case in which evaluation results 62 as shown in FIG. 12 are obtained, a shaded part indicated by a reference numeral 72 is set as the unusable region. It should be noted that an unusable region setting means 520 that determines the unusable region may be realized by software (program) and may be realized by human judgment. As above, in the step S130, an unusable region information 63 for determining the unusable region is obtained.

Next, a processing for determining separation values each being composed of a C value, a M value, and a B value which are values after the spot color separation in a case in which blue ink is used is performed (step S140). More specifically, in the step S140, based on the unusable region information 63, the corresponding relationships among "a CM value before the spot color separation", "a B value (a B value after the spot color separation)", and "a CM value after the spot color separation" are determined so that each "combination of a B value and a CM value" after the spot color separation is not included in the unusable region. It should be noted that data of B values is not included in the CMYK data 43 that is print data before the spot color separation. In the following description, for the sake of explanation, the CM value before the spot color separation is referred to as an "input CM value", the B value (the B value after the spot color separation) is referred to as an "output B value", and the CM value after the spot color separation is referred to as an "output CM value".

In a case in which evaluation results as shown in FIG. 12 are obtained, in the step S140, first, a minimum CM value that is minimum C value and minimum M value required to ensure that good granularity is obtained is found for each of the B values (here, for B values in 10 increments) as shown in FIG. 13. Regarding this, for example, when focusing on a column where the B value is 70 in FIG. 12, each area where the CM value is 50 or more is not set as the unusable region. Accordingly, as to "the B value is 70", the minimum CM value is set to 50. Further, when focusing on a column where the B value is 20 in FIG. 12, each area where the CM value is 10 or less is not set as the unusable region and each area where the CM value is 40 or more is not set as the unusable region. In such a case, if the minimum CM value is set to 0, then data for a combination of "the B value is 20" and "the CM value is 20" and data for a combination of "the B value is 20" and "the CM value is 30" can be included in the CMYKB data 44 and there is a possibility that good granularity cannot be obtained. Accordingly, as to "the B value is 20", the minimum CM value is set to 40.

Figure 14:
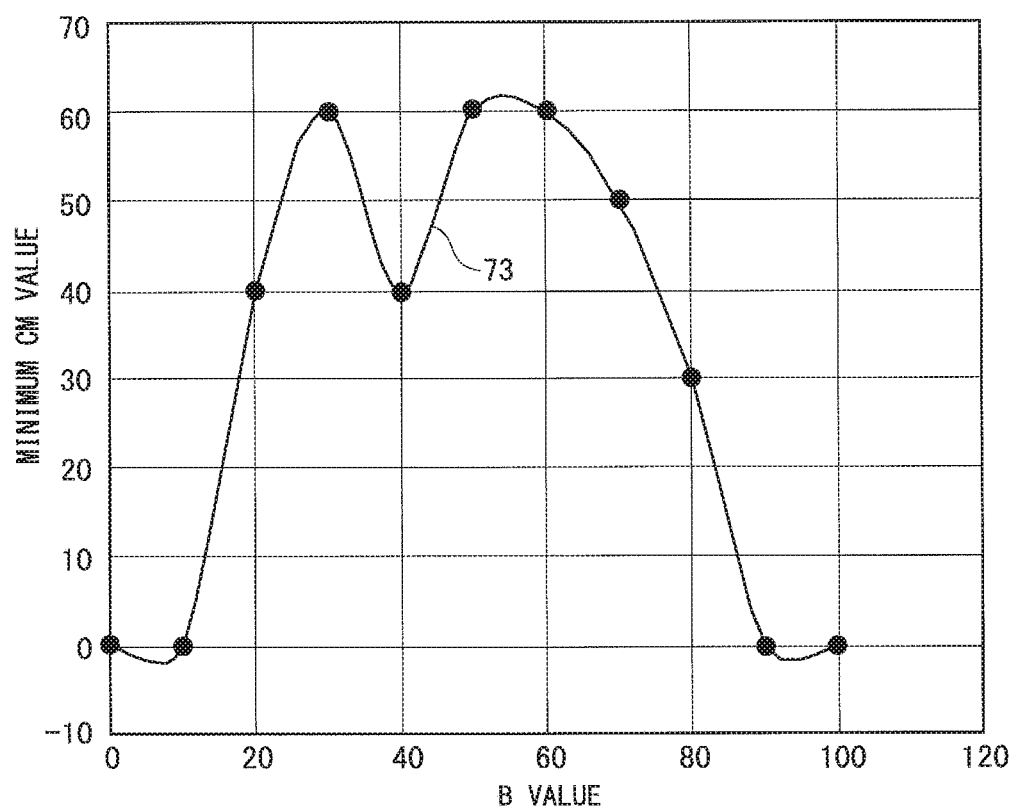
FIG. 14 is a diagram showing, as a curve, "relationships between a B value and a minimum CM value" shown in FIG. 13 in the embodiment.
Figure 16:
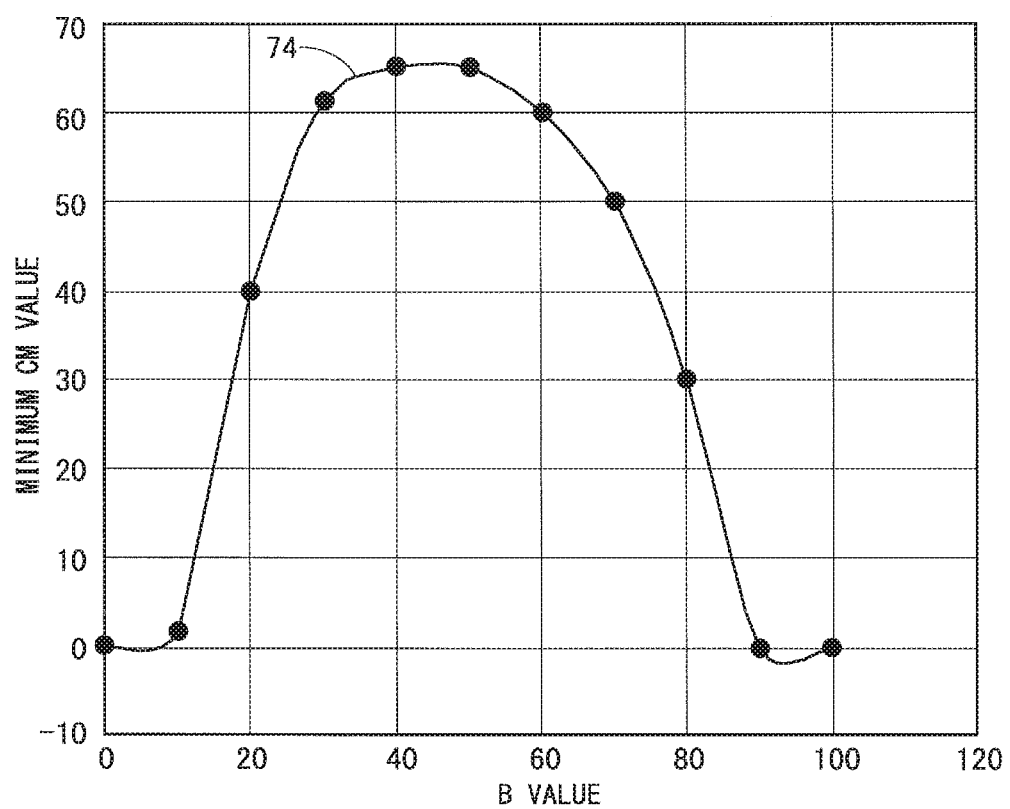
FIG. 16 is a diagram showing, as a curve, "relationships between a B value and a minimum CM value" shown in FIG. 15 in the embodiment.

When the results shown in FIG. 13 are expressed on a coordinate plane with the B value on the horizontal axis and the minimum CM value on the vertical axis, a curve 73 as shown in FIG. 14 is obtained. As grasped from FIG. 14, the curve 73 has two local maximum values. Here, if the output CM values are determined according to the curve 73, then there is a concern that tone jump is caused by the spot color separation. So, in a case in which a curve representing relationships between a B value and a minimum CM value has a plurality of local maximum values, minimum CM values corresponding to respective B values are corrected so that the curve has only one local maximum value. At that time, minimum CM values corresponding to respective B values are determined so that the largest value of minimum CM values appears near the center of "a range of the B values" where the granular feeling grows remarkably. From the above, the minimum CM values shown in FIG. 13 are corrected to values as shown in FIG. 15, for example. Thus, a curve representing relationships between a B value and a minimum CM value becomes a curve 74 as shown in FIG. 16.

Figure 17:
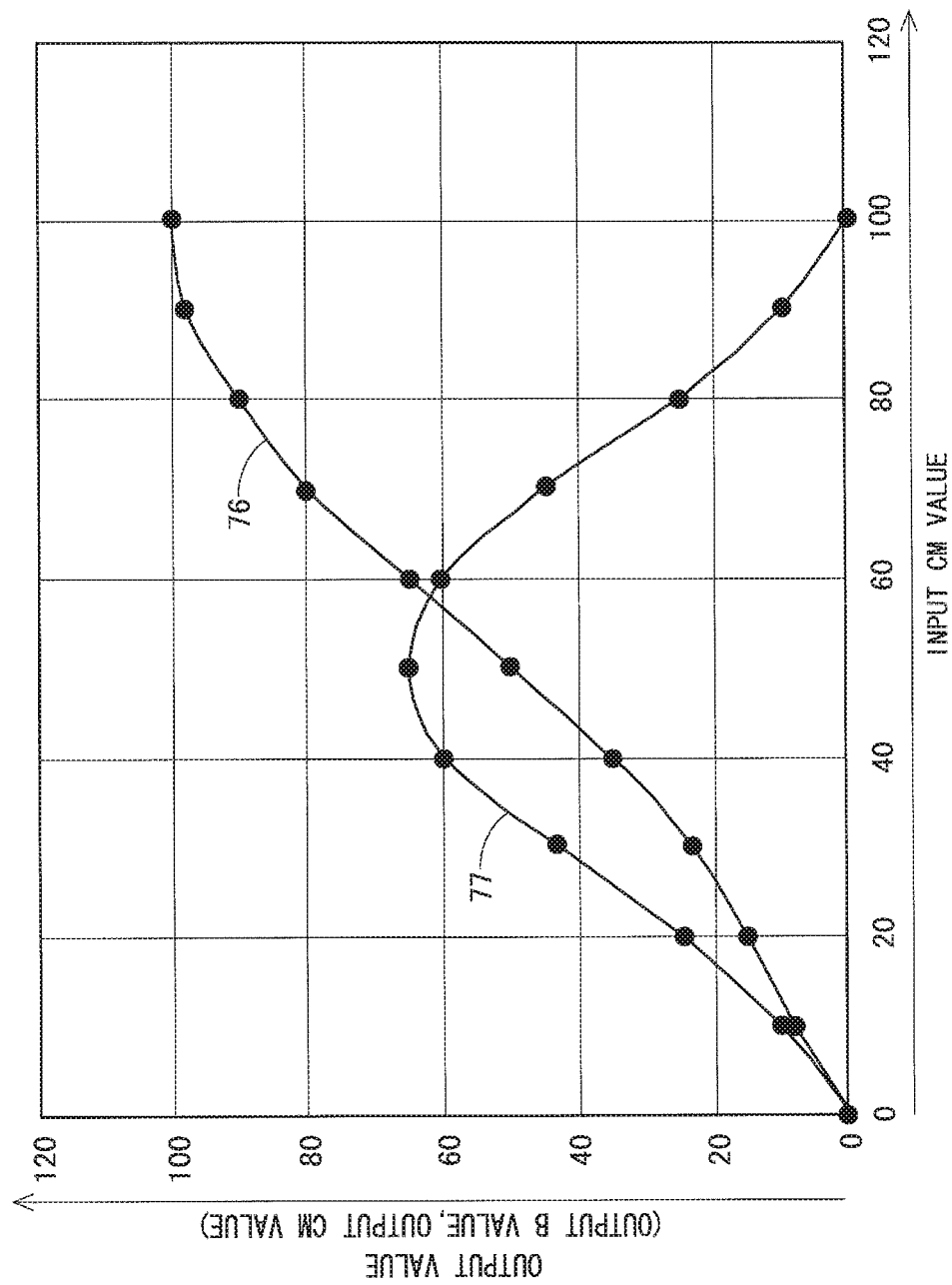
FIG. 17 is a diagram for explaining setting of corresponding relationships among an input CM value, an output B value, and an output CM value in the embodiment.

In the step S140, after relationships between a B value and a minimum CM value are determined as described above, the corresponding relationships among an input CM value, an output B value, and an output CM value are determined. Regarding this, first, the corresponding relationships between an input CM value and an output B value are determined. The corresponding relationships between an input CM value and an output B value are represented, for example, as a curve indicated by a reference numeral 76 in FIG. 17. Next, in consideration of the minimum CM values corresponding to the respective B values, the output CM values corresponding to the respective output B values are determined to such an extent that good granularity is obtained. As a result, for example, a curve indicated by a reference numeral 77 in FIG. 17 is obtained. Based on the graph (curves 76, 77 shown in FIG. 17) obtained in the above-described manner, the corresponding relationships among an input CM value, an output B value, and an output CM value are determined (that is, separation values are determined). An example of the corresponding relationships among an input CM value, an output B value, and an output CM value are shown in FIG. 18.

It should be noted that a separation values determination means 530 that performs a processing for determining the separation values may be realized by software (program) and may be realized by human judgment. As above, in the step S140, separation values information 64 that represents the corresponding relationships among an input CM value, an output B value, and an output CM value is obtained.

Figure 19:
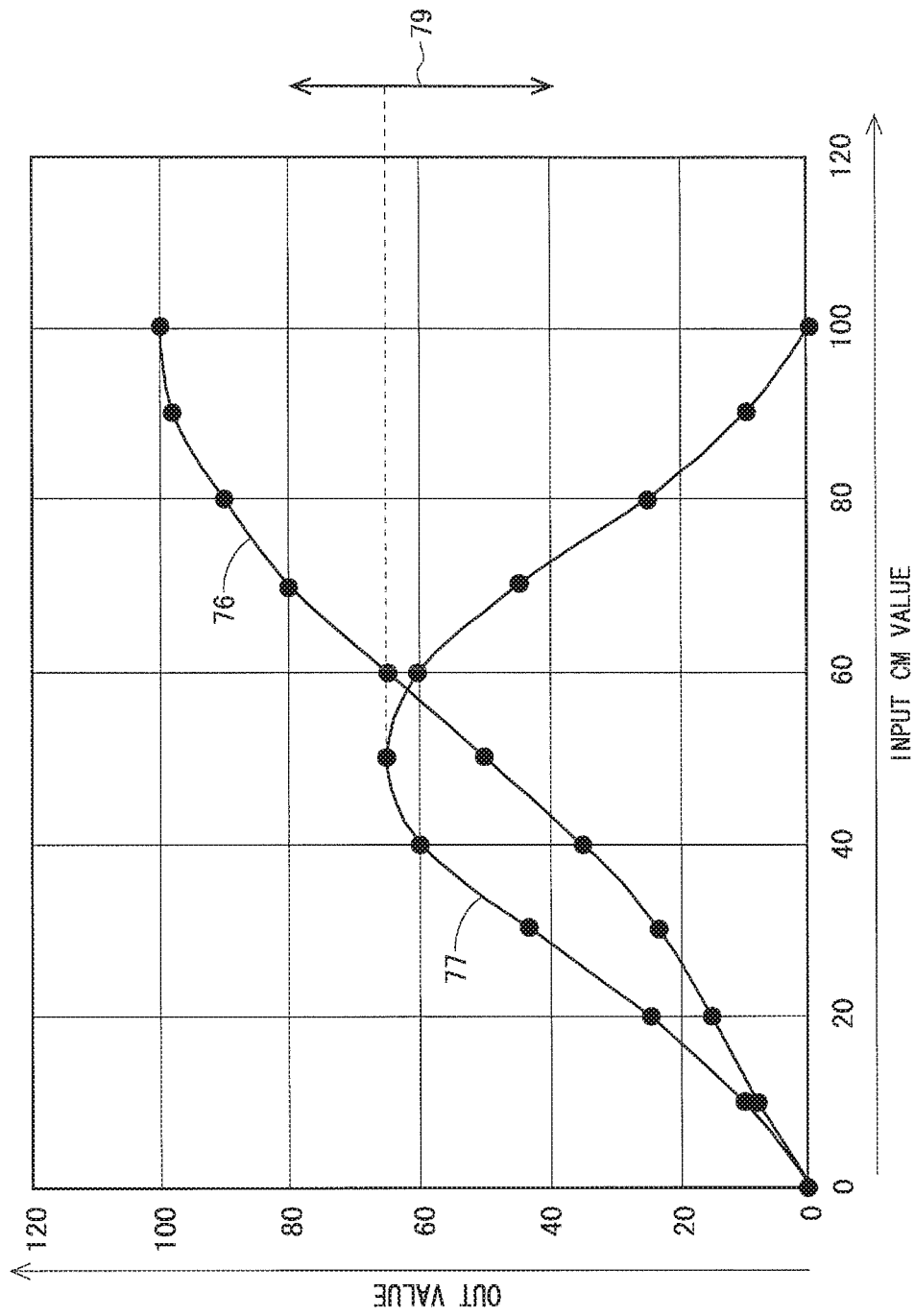
FIG. 19 is a diagram for explaining adjustment of the balance between excellence of the granularity and largeness of color gamut in the embodiment.
Figure 20:
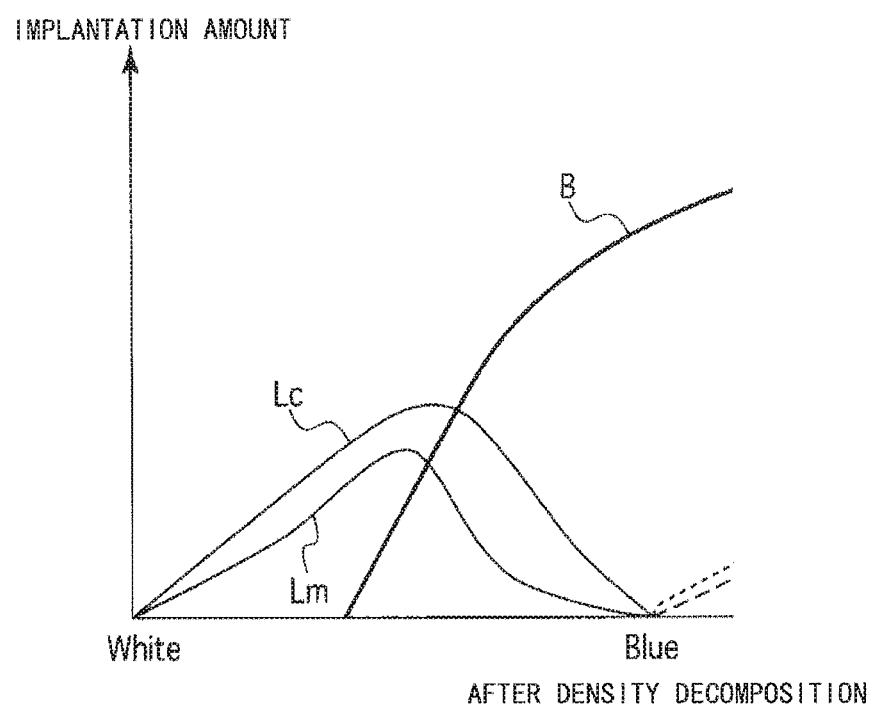
FIG. 20 is a diagram for explaining a method disclosed in the Japanese Patent Publication No. 2005-335191 with respect to a conventional example.
Figure 21:
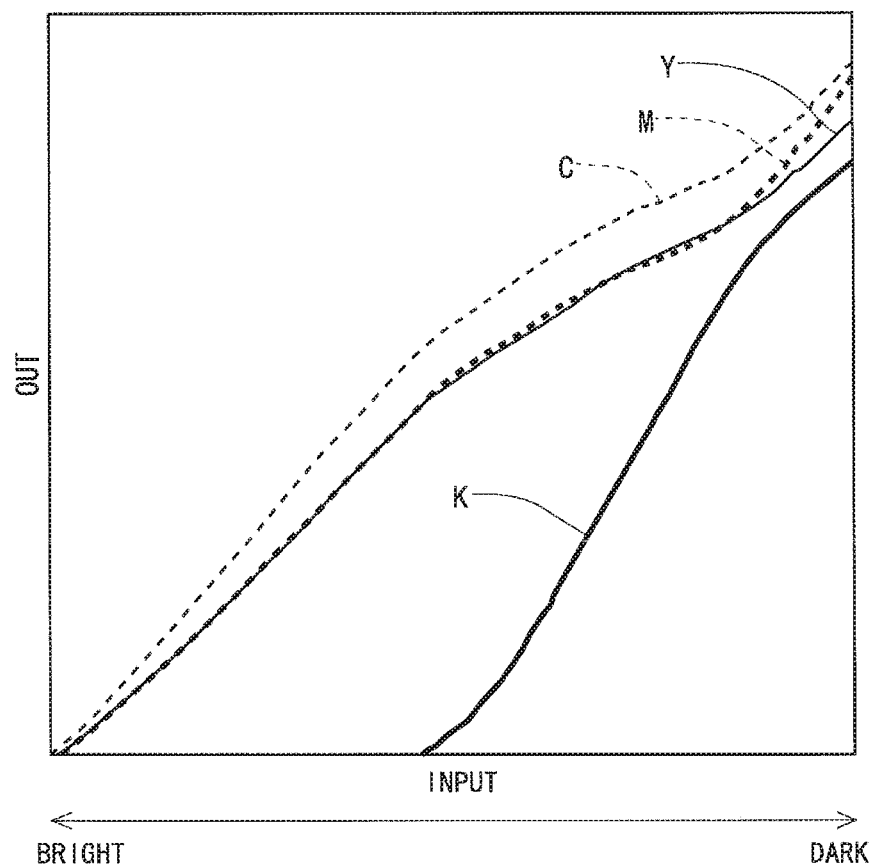
FIG. 21 is a diagram for explaining a method of using black ink only for colors darker than the intermediate tone portion with respect to a conventional example.

By the way, as described above, excellence of the granularity and largeness of color gamut have a trade-off relationship. Regarding this, the balance of excellence of the granularity and largeness of color gamut can be adjusted by adjusting the output CM values corresponding to the respective output B values. Specifically, the larger the output CM value, the better the granularity, and the smaller the output CM value, the larger the color gamut. Accordingly, in a case in which excellence of the granularity is regarded as important, it is preferable to increase the peak point of the output CM values (the maximum value of the curve 77 shown in FIG. 17). Moreover, in a case in which largeness of color gamut is regarded as important, it is preferable to decrease the peak point of the output CM values. In this manner, in the present embodiment, when the corresponding relationships among an input CM value, an output B value, and an output CM value are determined, the peak point of the output CM values is adjusted, for example, within a range indicated by a reference numeral 79 in FIG. 19. As above, in the step S140, the output CM values corresponding to the respective output B values are determined so that the higher a priority for excellence of the granularity, the larger the output CM value, and the higher a priority for largeness of color gamut, the smaller the output CM value, to such an extent that each "combination of a B value and a CM value" after the spot color separation is not included in the unusable region.

It should be noted that, in a case in which separation values are determined by software (program), a mode setting means 540 is provided in the print data processing device 200, and the mode setting means 540 sets a priority mode MO identifying whether excellence of the granularity is regarded as important or largeness of color gamut is regarded as important. Then, separation values are determined by the separation values determination means 530 depending on the priority mode MO set by the mode setting means 540

Finally, the spot color separation LUT 65 is created on the basis of the separation values information 64 by a spot color separation LUT creation means 550 so that the corresponding relationships determined in the step S140 are satisfied (S150). Thus, the spot color separation LUT creation processing ends. After the spot color separation LUT creation processing is ended, the process proceeds to step S200 of FIG. 7.

It should be noted that, in the present embodiment, the evaluation step is realized by the step S110 and the step S120, the unusable region setting step is realized by the step S130, the association step is realized by the step S140, and the table creation step is realized by the step S150. Further, the granularity check chart printing step is realized by the step S110 and the evaluation value measurement step is realized by the step S120.

<6. Specific Example of Spot Color Separation by Created Spot Color Separation LUT>

A specific example of the spot color separation by the spot color separation LUT 65 that is created on the basis of the corresponding relationships shown in FIG. 18 will be described. Here, CMYK data 43 of "the C value is 50, the M value is 40, the Y value is 10, and the K value is 0" is focused on. This CMYK data 43 is referred to as a "focused data".

The corresponding relationships shown in FIG. 18 are the corresponding relationships among an input CM value, an output B value, and an output CM value. As described above, the CM value is C value and M value on the assumption that C and M are set to the same value. However, as to the focused data, the C value is different from the M value. In such a case, the spot color separation is performed in such a manner that a common part of the C value and the M value (that is, smaller value) is regarded as the input CM value. In the example of the focused data, the input CM value is regarded as 40. Therefore, the processing is performed in such a manner that the C value is separated into "40" corresponding to the input CM value and "10" that is residual value. According to the corresponding relationships shown in FIG. 18, the output B value corresponding to "the input CM value is 40" is 35. Accordingly, the output B value regarding the focused data is 35. Further, according to the corresponding relationships shown in FIG. 18, the output CM value corresponding to "the input CM value is 40" is 60. Since the M value is equal to the input CM value with respect to the focused data, the M value after the spot color separation regarding the focused data is 60. The C value after the spot color separation regarding the focused data is calculated by adding the above-described residual value to the output CM value corresponding to "the input CM value is 40". That is, the C value after the spot color separation regarding the focused data is 70. Since the use of blue ink does not affect the Y value and the K value, the Y value and the K value do not change before and after the spot color separation. From the above, data (CMYKB data 44) after the spot color separation regarding the focused data is "the C value is 70, the M value is 60, the Y value is 10, the K value is 0, and the B value is 35".

<7. Advantageous Effects>

According to the present embodiment, based on the evaluation results concerning the granularity, an unusable region regarding combinations of a color value of a spot color (a B value) and a color value of process colors (a CM value) is determined. Then, the spot color separation LUT 65 is created so that each "combination of a color value of a spot color and a color value of process colors" after the spot color separation is not included in the unusable region. Since printing is performed using the print data after the spot color separation based on the spot color separation LUT 65, a high quality printed material whose granular feeling is small can be obtained. In this manner, the granular feeling of the printed material is reduced when printing is performed using high saturation ink in addition to ink of process colors. Further, since the balance of excellence of the granularity and largeness of color gamut can be adjusted when the output CM values are determined, it is possible to perform color reproduction with a desired color gamut while reducing the granular feeling of the printed material.

<8. Others>

The present invention is not limited to the above-described embodiment and may be implemented by making various modifications thereto without departing from the true scope and spirit of the present invention. For example, although the above embodiment describes, as an example, a case in which blue ink is used as the high saturation ink, the present invention can also be applied to a case in which ink other than blue ink (for example, orange ink, green ink, and purple ink) is used as the high saturation ink.

Moreover, although the above embodiment describes, as an example, a case in which ultraviolet curing ink is used, the present invention can also be applied to a case in which other ink (for example, water-based ink) is used.

Further, in the above-described embodiment, the inkjet printing device 100 prints the granularity check chart 61 (step S110 of FIG. 9), and the spot color separation LUT 65 that is created on the basis of the granularity check chart 61 is applied to the same inkjet printing device 100. However, the inkjet printing device that prints the granularity check chart 61 may be different from the inkjet printing device to which the spot color separation LUT 65 is applied. This will be described below as a variant of the above-described embodiment.

Refer to FIG. 22. FIG. 22 is an overall configuration diagram of a printing system according to a variant of the above-described embodiment. This printing system is composed of a first inkjet printing device 100, a print data processing device 200 that performs various processing, such as RIP, on print data, a colorimetric device 300 that performs colorimetry, a storage device 400 that stores the spot color separation LUT 65, and a second inkjet printing device 1000. The first inkjet printing device 100, the print data processing device 200, the colorimetric device 300, the storage device 400, and the second inkjet printing device 1000 are connected to each other via a communication line CL.

Since the configuration of the second inkjet printing device 1000 is the same as the configuration of the inkjet printing device 100 shown in FIG. 5 (the first inkjet printing device 100), a detailed description of the second inkjet printing device 1000 is omitted.

After the spot color separation LUT 65 is created by the print data processing device 200 in the same procedure (see FIG. 9) as in the above-described embodiment, the spot color separation LUT 65 is stored in the storage device 400. The spot color separation LUT 65 may be outputted to the optical disk 270 via the optical disk drive 27 from the storage device 400.

The spot color separation LUT 65 is directly sent to the second inkjet printing device 1000 that is different from the first inkjet printing device 100, from the print data processing device 200 through the communication line CL. Or the spot color separation LUT 65 is once stored in the storage device 400, and then it is sent to the second inkjet printing device 1000 through the communication line CL. Alternatively, the spot color separation LUT 65 is supplied to the second inkjet printing device 1000 via the optical disk 270. The spot color separation LUT 65 sent or supplied in this manner is stored in the spot color separation unit 1112 in the second inkjet printing device 1000.

In the second inkjet printing device 1000, the spot color separation LUT 65 created in advance is stored in the spot color separation unit 1112 (color conversion table storing step). Then, the processes from the step S200 to the step S600 of FIG. 7 are performed in sequence. Thereafter, in the second inkjet printing device 1000, the CMYKB data is generated by performing color conversion on the given CMYK data using the spot color separation LUT 65 (color conversion step), and an image is printed on the printing paper 122 using the CMYKB data (printing step).

While the present invention has been described in detail above, the above description is illustrative in all aspects and is not restrictive. It is understood that numerous other modifications and variations can be devised without departing from the scope of the invention.

This application is an application claiming priority based on Japanese Patent Application No. 2019-178326 entitled "Color Conversion Table Creation Method, Printing Method, Color Conversion Method, and Color Conversion Table Creation Program" filed on Sep. 30, 2019, and the contents of which are herein incorporated by reference.

What is claimed is:

1. A method for creating a color conversion table for performing color conversion from a first print data including only color values of process colors to a second print data including color values of a spot color and color values of process colors, the method comprising:
    an evaluation step of evaluating granularity for each area representing a combination of a color value of a spot color and a color value of process colors,
    an unusable region setting step of determining an unusable region that is a part of a plurality of areas each representing a combination of a color value of a spot color and a color value of process colors, based on evaluation results obtained in the evaluation step,
    an association step of determining corresponding relationships among a color value of process colors before the color conversion, a color value of a spot color after the color conversion, and a color value of process colors after the color conversion so that each combination of a color value of a spot color and a color value of process colors after the color conversion is not included in the unusable region, and
    a table creation step of creating the color conversion table so that the corresponding relationships determined in the association step are satisfied.

2. The method for creating a color conversion table according to claim 1, wherein
    the evaluation step includes:
        a granularity check chart printing step of printing a granularity check chart including a plurality of patches corresponding to respective combinations of a color value of a spot color and a color value of process colors, and
        an evaluation value measurement step of measuring an evaluation value concerning the granularity for each area representing a combination of a color value of a spot color and a color value of process colors using a granularity measurement device.

3. The method for creating a color conversion table according to claim 1, wherein
    in the association step, assuming that a curve representing color values of process colors after the color conversion corresponding to respective color values of a spot color is displayed on a coordinate plane with color values of the spot color as a horizontal axis and color values of the process colors as a vertical axis, when the curve has a plurality of local maximum values, color values of process colors after the color conversion are corrected so that the curve has only one local maximum value.

4. The method for creating a color conversion table according to claim 1, wherein
    in the association step, the corresponding relationships are determined so that each of color values of process colors after the color conversion is minimized to such an extent that the granularity is acceptable.

5. The method for creating a color conversion table according to claim 1, wherein
    in the association step, color values of process colors after the color conversion are determined so that the higher a priority for excellence of the granularity, the larger color values of process colors, and the higher a priority for largeness of color gamut, the smaller color values of process colors, to such an extent that each combination of a color value of a spot color and a color vale of process colors after the color conversion is not included in the unusable region.

6. The method for creating a color conversion table according to claim 1, wherein
when two process colors that constitute an alternative color of a target spot color are defined as a first process color and a second process color, combinations of a color value of the first process color and a color value of the second process color are converted into combinations of a color value of the first process color and a color value of the second process color and a color value of the target spot color.

7. The method for creating a color conversion table according to claim 6, wherein
in the evaluation step, the granularity is evaluated for each area representing a combination of a color value of the target spot color and a color value of the first process color and the second process color,
in the unusable region setting step, the unusable region that is the part of the plurality of areas each representing a combination of a color value of the target spot color and a color value of the first process color and the second process color, and
in the association step, the corresponding relationships among a color value of the first process color and the second process color before the color conversion, a color value of the target spot color after the color conversion, and a color value of the first process color and the second process color after the color conversion are determined so that each combination of a color value of the target spot color and a color value of the first process color and the second process color after the color conversion is not included in the unusable region.

8. The method for creating a color conversion table according to claim 6, wherein
the target spot color is blue.

9. The method for creating a color conversion table according to claim 8, wherein
the first process color is cyan, and
the second process color is magenta.

10. A printing method comprising:
a color conversion table storing step of storing the color conversion table created by the method for creating a color conversion table according to claim 2 into a printing device different from a printing device that prints the granularity check chart,
a color conversion step of performing the color conversion from the first print data to the second print data using the color conversion table stored in the color conversion table storing step, and
a printing step of printing, using the second print data, by the printing device that stores the color conversion table in the color conversion table storing step.

11. A color conversion method for converting input data including only color values of process colors into print data including color values of a spot color and color values of process colors, comprising:
an evaluation step of evaluating granularity for each area representing a combination of a color value of a spot color and a color value of process colors,
an unusable region setting step of determining an unusable region that is a part of a plurality of areas each representing a combination of a color value of a spot color and a color value of process colors, based on evaluation results obtained in the evaluation step,
an association step of determining corresponding relationships among a color value of process colors before color conversion, a color value of a spot color after the color conversion, and a color value of process colors after the color conversion so that each combination of a color value of a spot color and a color value of process colors after the color conversion is not included in the unusable region,
a table creation step of creating a color conversion table so that the corresponding relationships determined in the association step are satisfied,
a color chart printing step of printing a color chart by a target printing device after applying the color conversion table created in the table creation step to data for creating the color chart,
a colorimetry step of performing colorimetry of the color chart,
a color profile creation step of creating a color profile for output, based on colorimetry results obtained in the colorimetry step,
a first conversion step of converting the input data into device-independent data using a color profile for input,
a second conversion step of converting the device-independent data into the first print data using the color profile for output created in the color profile creation step, and
a third conversion step of converting, using the color conversion table created in the table creation step, the first print data into the second print data that is used to print by the target printing device.

* * * * *